United States Patent [19]

Krajewski et al.

[11] 4,310,653

[45] Jan. 12, 1982

[54] PRODUCTION OF MONOMERIC ETHERIFIED BISPHENOL-FORMALDEHYDE CONDENSATES

[75] Inventors: John J. Krajewski, Wheeling; Edward J. Murphy, Mt. Prospect, both of Ill.

[73] Assignee: DeSoto, Inc., Des Plaines, Ill.

[21] Appl. No.: 195,110

[22] Filed: Oct. 8, 1980

[51] Int. Cl.³ .................. C08G 2/34; C08G 8/20; C08G 8/36
[52] U.S. Cl. .................. 528/143; 204/14 R; 204/181 C; 260/29.3; 528/137; 528/153; 568/608; 568/609
[58] Field of Search .................. 528/137, 143, 153; 568/608, 609

[56] References Cited

U.S. PATENT DOCUMENTS

| | | | |
|---|---|---|---|
| 4,033,909 | 7/1977 | Papa | 528/165 X |
| 4,116,921 | 9/1978 | Olivo et al. | 528/153 X |
| 4,182,732 | 1/1980 | Fry | 528/153 X |
| 4,260,730 | 4/1981 | Sekmakas et al. | 528/153 X |

*Primary Examiner*—Howard E. Schain
*Attorney, Agent, or Firm*—Dressler, Goldsmith, Shore, Sutker & Milnamow, Ltd.

[57] ABSTRACT

A method of producing essentially monomeric etherified formaldehyde condensates with a bisphenol having a plurality of formaldehyde-reactive sites is disclosed in which the bisphenol is reacted with at least about 2 moles of formaldehyde per mole of bisphenol in solution in etherifying alcohol in the presence of an insoluble strong acid cation exchange resin. The reaction is carried out at a reaction temperature of from about 30° C. to about 100° C. to simultaneously provide the desired methylolation and etherification without introducing soluble ionic contaminants.

11 Claims, No Drawings

PRODUCTION OF MONOMERIC ETHERIFIED BISPHENOL-FORMALDEHYDE CONDENSATES

TECHNICAL FIELD

The invention relates to the production of essentially monomeric etherified bisphenol-formaldehyde condensates.

BACKGROUND ART

Etherified phenol-based formaldehyde condensates are well known cross-linking agents, but they have not been very useful in electrocoating because of various problems, and especially because they include traces of the catalysts used in their preparation. These catalysts are water soluble ions, and they contaminate the electrocoating bath, producing all sorts of difficulties. Also, when phenolic resols are etherified to provide water insolubility, they tend to polymerize and lose their desired monomeric form. Moreover, phenolic resins produce coatings which are badly discolored and possess poor corrosion resistance.

Bisphenol-formaldehyde condensates have overcome some of the difficulties in electrocoating, but it is necessary to prepare these in an economical fashion and without introducing the ionic contaminants which have been found to be difficult and expensive to remove entirely.

It is also known to use strong acid ion exchange resins to catalyze reactions which are conventionally catalyzed using dissolved acids. When phenolic resins are reacted with formaldehyde and then reacted with an alcohol to etherify the aldehyde adduct it is usual to employ a basic catalyst in the first stage of the reaction, and then to switch to an acid catalyst in a second stage in order to carry out the desired etherification. It is also known that an acid catalyst can be used in the first stage of the reaction, but this is not normally done because it leads to polymeric products.

DISCLOSURE OF INVENTION

In accordance with this invention, a bisphenol is simultaneously adducted with formaldehyde and condensed with an alcohol without introducing ionic contamination by contacting an alcohol solution containing dissolved formaldehyde and a bisphenol having a plurality of formaldehyde-reactive sites with a strong acid cation exchange resin at a temperature of at least about 30° C., preferably at a temperature in the range of about 40° C. to about 85° C. Temperatures over about 100° C. induce some polymerization. It is surprising to find that the reaction proceeds well, though slowly, at low temperature, that polymerization is largely avoided over the temperature range, and that water can be removed or not, as desired.

The reaction is desirably carried out under reflux conditions using vacuum as needed, depending upon the alcohol selected and the temperature used.

When the reaction is completed, excess alcohol can be removed, conveniently by distillation under vacuum, and unreacted formaldehyde would be removed at the same time. The insoluble cation exchange resin, if present, is also removed, conveniently by filtration.

The product is a concentrated etherified bisphenol-formaldehyde condensate which is essentially monomeric and which is free of water soluble ionic contaminants to be ready for use as a cross-linking agent, especially in either anodic or cathodic electrodeposition processes. A considerable improvement in avoiding discoloration is easily seen by comparing the product with a conventionally produced product. The cure in cationic systems is particularly effective and superior to that obtainable using melamine or benzoguanamine-formaldehyde condensates, and this is surprising.

The bisphenol-based products of this invention are particularly useful in electrocoating where the absence of ionic contaminants is a feature of this invention. The bisphenols useful herein are those having the structure:

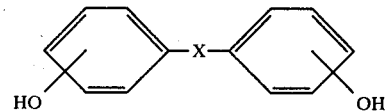

wherein X is a straight chain or branched chain divalent aliphatic radical of from 1 to 3 carbon atoms, or $>SO_2$, $>SO$, or $-O-$.

This known class of compounds is broadly referred to as bisphenols. The preferred bisphenol is bisphenol A in which X is 2-2 propylidene and the two OH groups are in the para position. Other bisphenols which can be used are illustrated by 4,4'-thiodiphenol and 4,4'-sulfonyl diphenol. Tetrasubstitutable bisphenols are preferred.

The formaldehyde reactant is used in alcohol solution. At least about 2 moles of formaldehyde are used per mol of the bisphenol, but more is desirably used to push the reaction. While it is preferred to use about 4 or more moles of formaldehyde per mol of the bisphenol, only about 2.5 to 3 etherified methylol groups are formed on the average, this conclusion being based on the increase in solids content provided by the single stage reaction of this invention. As previously indicated, unreacted formaldehyde distills off after the reaction is over and is removed together with the excess alcohol.

Any alcohol may be used, but $C_1-C_8$ alkanols, preferably a $C_4-C_8$ alkanol, and most preferably a butanol which may be either n-butanol or isobutanol are used. The selection of isopropanol is a feature of this invention since secondary alcohols are useful herein and do not normally react well enough to be used.

The proportion of alcohol is desirably in stoichiometric excess so that there will be enough for alkylation and an excess to provide a solution medium of low viscosity which is easily handled. All or a portion of the excess can be removed when the alkylation reaction is over.

The strong acid cation exchange resin is an insoluble cross-linked polymeric matrix carrying $-SO_3H$ groups in the hydrogen form. The polymeric matrix is most commonly polystyrene cross-linked with divinyl benzene. However, many insoluble strong acid cation exchange resin can be used herein, these being known materials. The resin can be used in various physical forms, but the particulate form is most available. These particles can be mixed in with the solution of reactants, or the solution of reactants can be poured through one or more beds containing the exchange resin. When using beds, the product solution drains away from the catalyst. When using free particles, these are removed after the reaction by filtration.

Amberlyst 15 produced by Rohm and Haas Co. is a strong acid cation exchange resin which is useful herein and it will be used as illustrative. In accordance with the Rohm and Haas instructions for its use, it is hydrated and washed to ready it for use.

While strong acid cationic exchange resins are known catalysts for use where acid catalysts are used, the two stage reaction contemplated herein normally leads to the production of high molecular weight products when both stages are carried out in an acidic medium, whereas essentially monomeric products are desired herein. It is surprising to find that the products obtained in this invention are essentially monomeric even though extensive adduction with the formaldehyde reactant is obtained. Thus, reacting bisphenol A with 4 moles of formaldehyde in the presence of excess butanol in this invention provides an essentially monomeric product containing from 2.5–3.0 methylol groups per molecule of the bisphenol.

The electrocoating baths are aqueous baths which contain a reactive resin together with the bisphenol-formaldehyde curing agent of this invention. The reactive resin includes salt-forming groups, like carboxylic acid groups or amine groups, and these are at least partially neutralized with a base, typically ammonia or other amine, like triethyl amine, or with a solubilizing acid, like acetic acid or dimethylol propionic acid, to provide salt groups which permit the reactive resin to be dispersed stably in water. The bisphenolic resin curing agents provided by this invention are not only very economical because they are produced in a single stage without subsequent purification, but they are superior because they produce hard, solvent resistant and impact resistant cured films having superior color, and also because they provide superior stability in the electrocoating bath.

Referring more particularly to the reactive resins which are dissolved or dispersed in the aqueous medium in the form of salts, two types of resins are particularly contemplated. First, carboxyl-functional solution copolymers containing from 5% to 35% of copolymerized monoethylenically unsaturated carboxylic acid, such as acrylic acid. These are reacted with volatile bases as previously explained. Second, amine-functional solution copolymers containing from 5% to 35% of copolymerized monoethylenically unsaturated amine, preferably a tertiary amine like dimethyl aminoethyl methacrylate or dimethyl aminopropyl methacrylamide. These are reacted with solubilizing acids as previously noted.

These copolymers are produced by copolymerization in organic solvent solution (preferably in a water miscible organic solvent) to produce a soluble copolymer primarily constituted by monoethylenically unsaturated monomers, such as styrene, vinyl toluene, methyl methacrylate, methyl acrylate, ethyl acrylate, n-butyl and isobutyl acrylate or methacrylate, dibutyl maleate, acrylonitrile, and the like.

Reactive monomers may also be present, these being primarily hydroxy-functional monomers illustrated by hydroxy alkyl acrylates and methacrylates in which the alkyl group normally contains from 2–4 carbon atoms. Hydroxy ethyl acrylate is preferred. These reactive monomers may constitute from 5% to 40%, preferably from 10% to 30% of the weight of the copolymer. Amide monomers are also useful in the same proportions, such as acrylamide. Any functional group which is reactive with the methylol group may be used for cure with its selection being of secondary interest to this invention.

The electrocoating baths will typically contain from 5% to 15% of resin solids, and are thus different from ordinary coating solutions.

EXAMPLE 1

To a reactor equipped with mechanical stirrer, reflux condenser (including a Dean-Stark trap to collect water), inert gas sparge, temperature control mechanism and vacuum apparatus, charge the following in order:

| Parts by Weight | Component |
| --- | --- |
| 670 | Butyl Formcel (note 1) |
| 654 | Butanol |
| 407 | Bisphenol A |
| 60 | Amberlyst 15 (wet) [note 2] |

Agitation is begun at once. After the Bisphenol A is dissolved, set the Dean-Stark trap to collect water. Then apply a vacuum of about 27 inches of water. Slowly raise the temperature to begin reflux.

After 4 hours, apply heat to increase the temperature and remove, by vacuum distillation, about 500 parts of butanol up to a maximum temperature of 90° C. Distillation is then terminated and the vacuum is released. The product resin solution is then filtered to remove the Amberlyst 15 catalyst which is an insoluble powder.

The product resin solution has a light amber color and a solids content of 85%. It is essentially composed of a highly monomeric butylated Bisphenol A-formaldehyde condensate containing an average of about 2.0 methylol groups (etherified) per molecule of bisphenol. The solution is free of water soluble ionic contaminants and is suitable for use in either anodic or cathodic electrocoating deposition processes. Note 1: Butyl Formcel is a product of Celanese Chemical Co. and is a 40% solution of formaldehyde in butanol. Note 2: Amberlyst 15 is a strong acid cation exchange resin having $SO_3H$ groups carried by a divinylbenzene-crosslinked polystyrene matrix. It is produced by Rohm and Haas Co. and was hydrated and washed in accordance with their instructions to prepare it for use.

EXAMPLE 2

| Grams | Component |
| --- | --- |
| 250 | 2-Butoxy ethanol |
| 70 | Dimethylol propionic acid |

The above are charged to a reactor and heated to 95° C. to form a heel of solution in which the polymerization is carried out.

| 335 | Styrene |
| --- | --- |
| 180 | 2-hydroxyethyl acrylate |
| 165 | Dimethyl aminoethyl methacrylate |
| 315 | Butyl acrylate |
| 18 | Azobisisobutyronitrile |

These are premixed and added to the heel of acid-containing solvent slowly over a 3 hour period while maintaining 90° C. When this addition is finished, most of the polymerization has been completed and excessive viscosity is avoided by adding 150 grams of 2-butoxy ethanol. Then, and to insure completion of reaction, 3 grams of azobisisobutyronitrile is added and the temperature is maintained at 90° C. for one hour, and this procedure is repeated two more times at which point the conversion of monomer to polymre is complete and 90 grams of 2-butoxy ethanol is added to thin the solution. 2400 grams of deionized water is then added with rapid agitation to provide an aqueous bath having a nonvolatile content of 26.5%, a pH of 6.8 and an amine value (theoretical) of 58 based on solids. The bath is a milky dispersion, and it is stable.

EXAMPLE 3

The acrylic copolymer of Example 2 is combined with the bisphenol-formaldehyde ether of Example 1 to provide a 75:25 weight ratio mixture. Dilute with water to 10% resin solids and provide a bath having a pH of about 6.9. This bath electrodeposits at the cathode to produce a film of about 0.6 mil in thickness using a voltage of 80 volts. Two cure schedules can be used to cure the products (20 minutes at 375° F. and 20 minutes at 350° F.).

Excellent results with the bisphenol-formaldehyde ether of Example 1 are obtained, and this is especially important at the lower baking temperature. The bisphenol-formaldehyde ether of Example 1 did not introduce ionic contaminants into the bath even though it was used without modification after removal of the Amberlyst 15 catalyst by filtration.

In the foregoing specification and in the attached claims, all parts are by weight unless otherwise stated.

A series of comparative tests were run using various cross-linking resins to cure the acrylic cationic copolymer of Example 2. In each instance the cross-linking resin was used in a weight ratio of 20:80 with respect to the cationic copolymer, a pigment to binder weight ratio of 0.25:1 was used for pigmentation, and the bath solids was 12%. Electrodeposition was carried out at the cathode on Parker EP-10 treated steel panels which were baked for 20 minutes in a 400° F. oven. The film thickness ranges from 0.55 to 0.65 mil.

All of the films cured to a solvent-resistant condition as noted by passing 200 double rubs with a methyl ethyl ketone-saturated cloth (the benzoguanamine-cured film softened in this test). However, the film properties were a surprise. The benzoguanamine-cured film had a hardness of H+. The melamine-cured film was harder (2H) as suggested by the higher functionality of melamine over benzoguanamine (6 v. 4). However, the essentially disubstituted product of Example 1 was harder (2H+), and this harder film was more flexible and also more detergent resistant and more salt spray resistant.

To complete the comparison, Example 1 was repeated except the reactants were first methylolated in the presence of a trace of sodium hydroxide and then the methylolated product was etherified in the Amberlyst 15 cation exchange resin as described in Example 1. By solids content this two stage resin was tributoxymethylated instead of about dibutoxymethylated as in Example 1. However, the bath stability which was excellent when the Example 1 product was used, was now quite poor. After only 5 days, the electrodeposited film became very gassy and adhesion of the wet coating became poor. The single stage products of Example 1 are therefore uniquely superior cross-linking agents.

What is claimed is:

1. A method of producing essentially monomeric etherified formaldehyde condensates with a bisphenol having a plurality of formaldehyde-reactive sites, said condensates being substantially free of ionic contaminants comprising, reacting said bisphenol with at least about 2 moles of formaldehyde per mole of bisphenol in solution in etherifying alcohol in the presence of an insoluble strong acid cation exchange resin, the reaction bein carried out at a temperature of from about 30° C. to about 100° C. to simultaneously provide the desired methylolation and etherification without introducing soluble ionic contaminants.

2. A method as recited in claim 1 in which the reaction is carried out under reflux conditions.

3. A method as recited in claim 2 in which water is removed before the solvent is returned to the reacting solution.

4. A method as recited in claim 3 in which said alcohol is butanol and vacuum is used to maintain a reflux temperature in the range of 60°–80° C.

5. A method as recited in claim 1 in which said bisphenol is tetrasubstitutable.

6. A method as recited in claim 2 in which said formaldehyde is used in a proportion of at least about 4 moles of formaldehyde per mol of said bisphenol.

7. A method as recited in claim 1 in which said alcohol is a $C_1$–$C_8$ alkanol.

8. A method as recited in claims 1, 5 or 6 in which said alcohol is butanol.

9. A method as recited in any of claims 1, 5, 6 or 8 in which said strong acid cation exchange resin carries $SO_3H$ groups on a divinyl benzene-crosslinked polystyrene matrix.

10. A method as recited in claim 9 in which said bisphenol is bisphenol A.

11. A method of producing essentially monomeric etherified formaldehyde condensates with a bisphenol having a plurality of formaldehyde-reactive sites, said condensates being substantially free of water-soluble contaminants comprising, reacting said bisphenol with at least about 4 moles of formaldehyde per mole of bisphenol in solution in excess $C_1$–$C_8$ alkanol in the presence of particles of an insoluble strong acid cation exchange resin which is an insoluble crosslinked polymeric matrix carrying —$SO_3H$ groups, the reaction being carried out at a reaction temperature of from about 40° C. to about 85° C. to simultaneously provide the desired methylolation and etherification without introducing soluble ionic contaminants.

* * * * *